United States Patent [19]

Sidline

[11] 4,370,550
[45] Jan. 25, 1983

[54] DUAL READ-RECORD HEAD FOR MAGNETIC CARD MACHINE ACTUATOR

[75] Inventor: George B. Sidline, Belmont, Calif.

[73] Assignee: Service Distributors, Inc., San Francisco, Calif.

[21] Appl. No.: 201,693

[22] Filed: Oct. 29, 1980

[51] Int. Cl.³ .............................................. G06K 5/00
[52] U.S. Cl. .................................... 235/449; 235/375; 235/380
[58] Field of Search ........................ 235/380, 449, 375

[56] References Cited

U.S. PATENT DOCUMENTS

| 3,875,375 | 4/1975 | Scuitto | 235/380 |
| 4,016,405 | 4/1977 | McCunie | 235/380 |
| 4,020,325 | 4/1977 | Pfost | 235/449 |
| 4,024,379 | 5/1977 | Pfost | 235/449 |

FOREIGN PATENT DOCUMENTS

| 2910256 | of 1979 | Fed. Rep. of Germany . |
| 599634 | of 1978 | Switzerland . |
| 965482 | of 1962 | United Kingdom . |

*Primary Examiner*—Harold I. Pitts
*Attorney, Agent, or Firm*—Julian Caplan

[57] ABSTRACT

An improvement on prior art uses a card having a longitudinal strip of magnetic tape encoded with two separate tracks. One track contains a security code and data as to the number of uses remaining on the card. The other track is a control having signals which are read directly proportional to the speed of movement of the card. The card is inserted in a slot in a machine which feeds the card into the machine, reads the data on both tracks, reverses the direction of the card, and impacts the card with a hole to indicate that it has been used one time. The position of impact is controlled by the number of uses of the card prior to the particular use and the control track. While the card is traveling in the reverse direction the first track is re-recorded with the number of remaining uses and security code at a rate determined by the control track. The invention overcomes a problem of prior systems resulting from factors interfering with precise speed of movement of the card. Since the control track moves at a proportioned speed, the use of oscillators, clocks, phase locked loops and other timing devices is eliminated.

8 Claims, 9 Drawing Figures

U.S. Patent  Jan. 25, 1983  Sheet 1 of 3  4,370,550
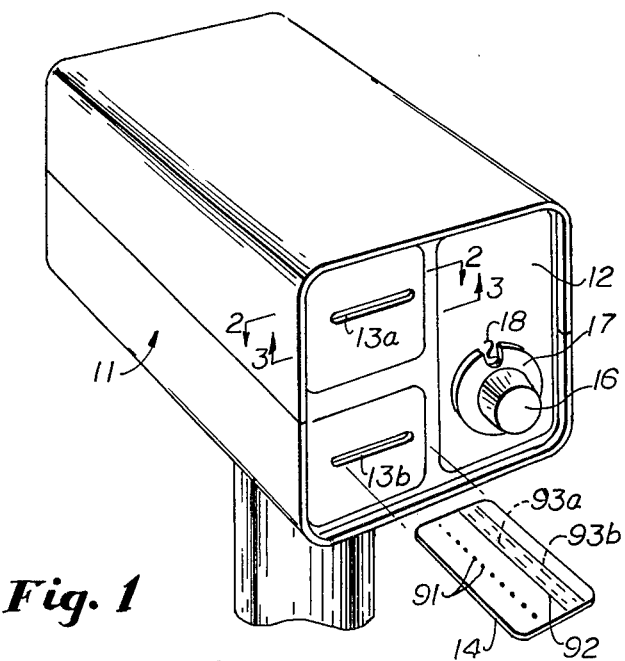
Fig. 1
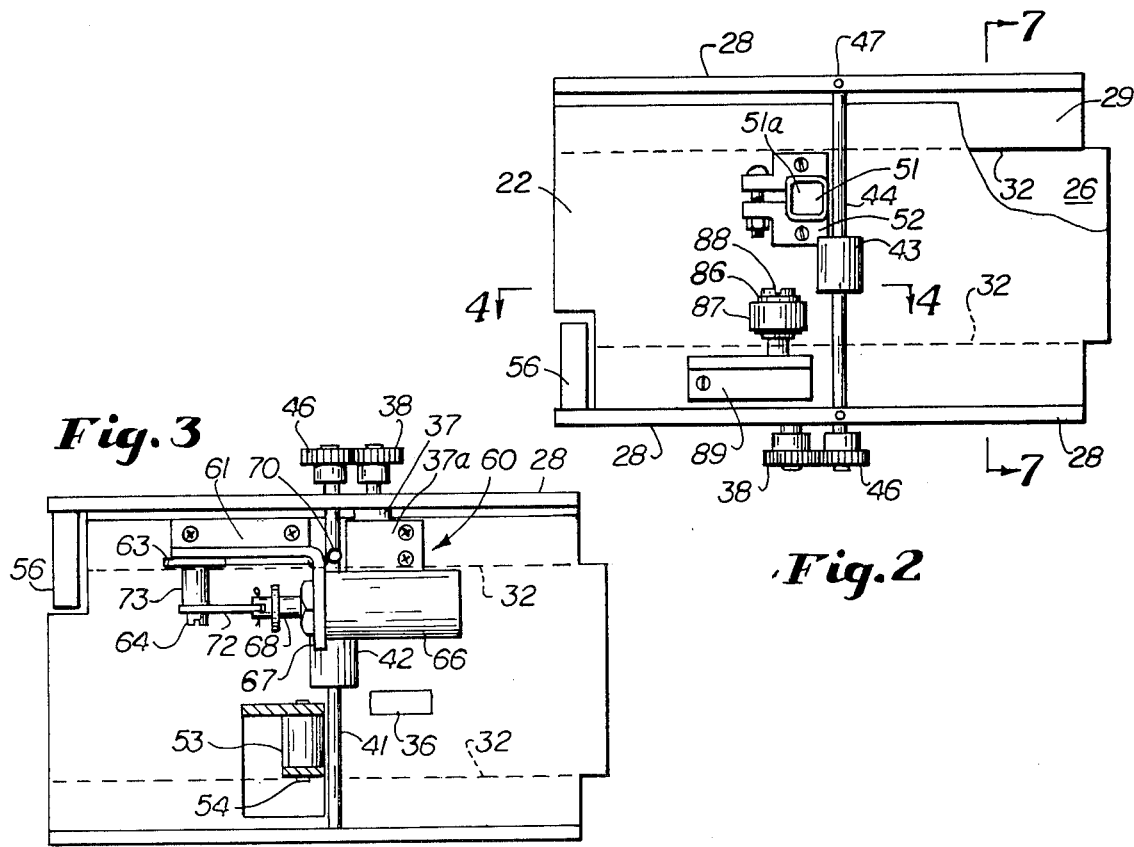
Fig. 2
Fig. 3

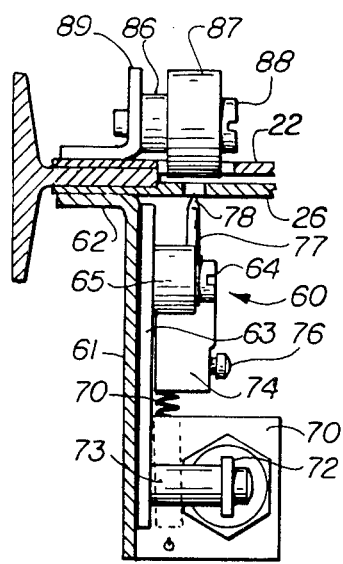
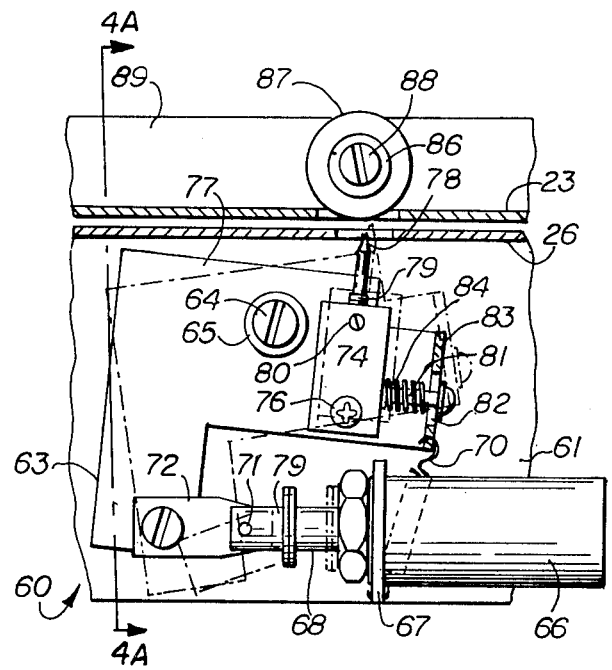
Fig.4A   Fig.4
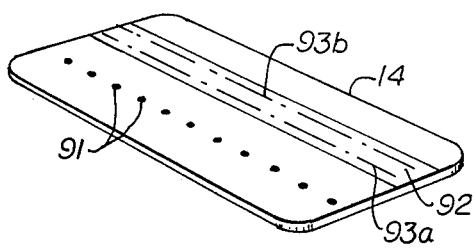
Fig.5
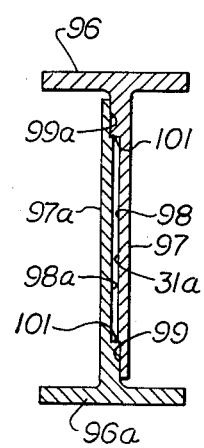
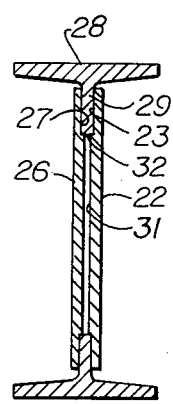
Fig.7   Fig.6

DUAL READ-RECORD HEAD FOR MAGNETIC CARD MACHINE ACTUATOR

CROSS-REFERENCE TO RELATED PATENTS AND BACKGROUND OF INVENTION

This invention relates to a new and improved dual read-record head for magnetic card machine actuator. Reference is made to earlier patents of assignee U.S. Pat. Nos. 4,020,325 issued Apr. 26, 1977, and 4,024,379 issued May 17, 1977, on which the present invention is an improvement. Many of the objects and advantages of the prior patents are applicable to the present invention. It will be observed that many of the mechanisms hereinafter described are likewise disclosed in said patents, and, for brevity, some of the features are not herein described in detail. Reference is further made to U.S. application Ser. No. 06/161,333 filed June 20, 1980, owned by the assignee of this application.

A continuing problem in the service of providing coin-operated laundry machines installed in apartment houses and other locations is the temptation to cheat the machines either by the use of slugs, by prying open coin boxes, or other means. The use of encoded magnetic tape cards which initially are so encoded as to furnish plural operations of the washer or dryer machines is disclosed in said patents. The present invention provides a number of improvements thereon.

A further feature of the use of such cards is that the cost of each use need not necessarily be in integral multiples of 5 cents, 10 cents, or 25 cents. Consequently, the cost of each use may be set to any value, even fractional.

SUMMARY OF THE INVENTION

In the apparatus hereinafter described, one of the features is the punching of holes in the card and the encoding of information on the magnetic strip as independent functions. To locate each hole in proper position and properly to encode a security code and data showing the number of operations still remaining on the card, it is necessary that the mechanical and electronic devices which perform these functions be energized in close timing with the movement of the card. The present invention provides means for insuring proper timing of these functions of the apparatus. It is a feature of the present invention that the card which the patron receives has a magnetic strip, and that this strip has two tracks. One track contains a security code and other data as to the number of machine operations which remain on the card. The other track has timing signals. A dual head is mounted on the apparatus which reads the two tracks.

It will be unerstood that the velocity and continuity of movement of the card through the apparatus may vary, depending upon the condition of the card, delays occasioned by the punching operation, and other factors. The present invention provides compensation for such variation, and causes energization of the mechanical and electrical functions of the machines.

One of the problems in the use of cards has been that the density of the recording upon the magnetic tape varies from unit to unit and the data rate varies as a function of speed. This makes interchangeability from unit to unit troublesome. The present invention promotes such interchangeability.

Another feature of the invention is the fact that the timing signals are initially encoded on the tape at precise speed, assuring uniform density. Hence, the clock rate is directly proportional to the speed of movement of the card. The signals on this second track function as a clock and do not vary from card to card.

Another feature of the invention is the fact that the use of an oscillator in the electronic system for reading and writing of data by the apparatus may be eliminated.

Various optical, mechanical and electronic means have been used for timing heretofore. These are all eliminated in accordance with the present invention.

The present invention provides better resolution, accuracy, and repeatability of the location of the impact of the punch on the card.

Other objects of the present invention will become apparent upon reading the following specification and referring to the accompanying drawings in which similar characters of reference represent corresponding parts in each of the several views.

BRIEF DESCRIPTION OF THE DRAWINGS

In the drawings:

FIG. 1 is a perspective view of the apparatus of the present invention showing a card about to be inserted.

FIG. 2 is a sectional view taken substantially along the line 2—2 of FIG. 1.

FIG. 3 is a sectional view taken substantially along the line 3—3 of FIG. 1

FIG. 4 is a sectional view taken substantially along the line 4—4 of FIG. 2.

FIG. 4a is a sectional view taken substantially along the line 4a—4a of FIG. 4.

FIG. 5 is a perspective view of a card used with the present invention.

FIG. 6 is a cross-section taken substantially along the line 6—6 of FIG. 2.

FIG. 7 is a view similar to FIG. 6 of a modification.

DESCRIPTION OF THE PREFERRED EMBODIMENT

Figure 8:
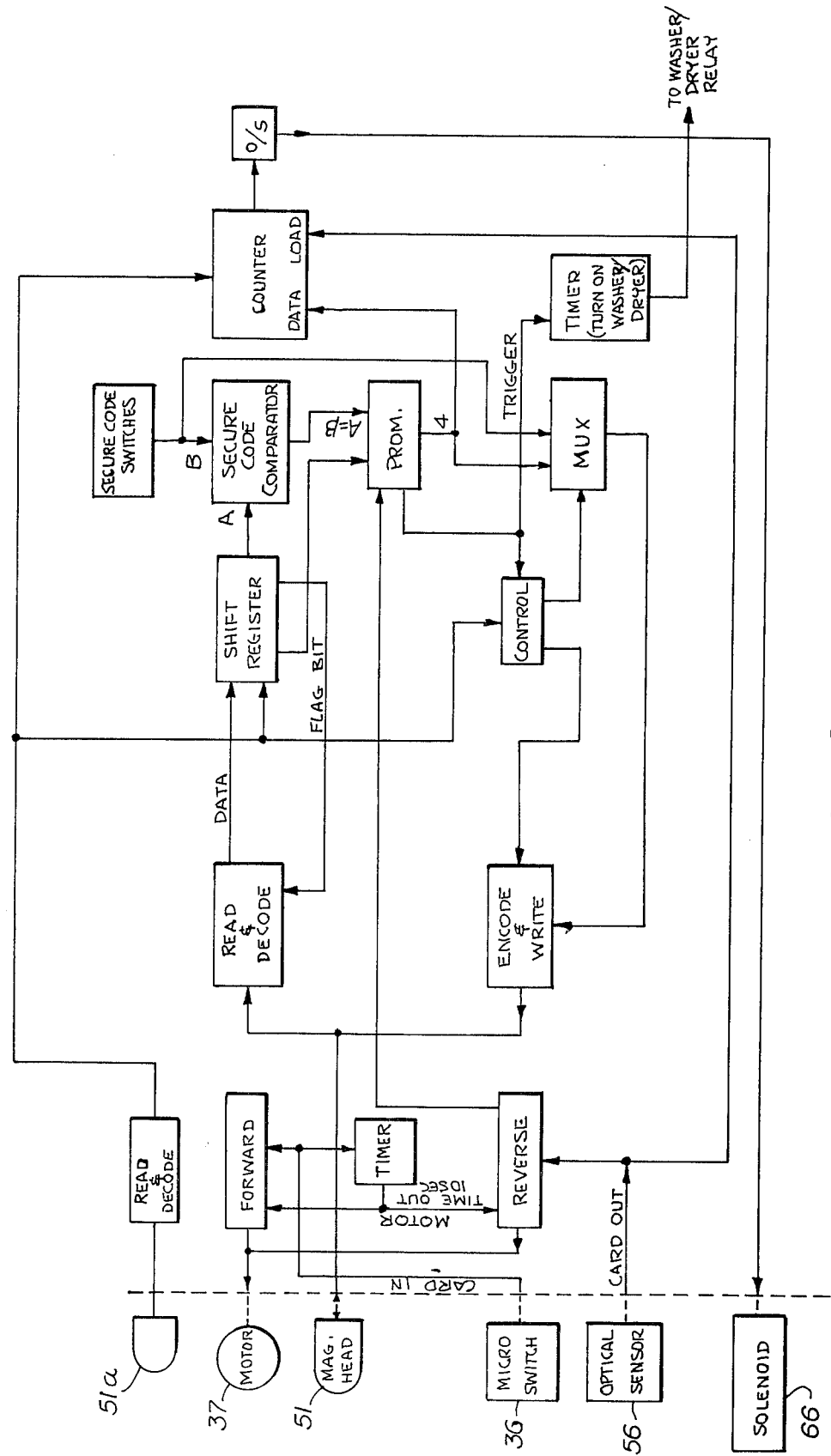
FIG. 8 is a schematic block diagram of a preferred electronic system for the invention.

Many of the mechanisms hereinafter described appear in the aforesaid U.S. Pat. Nos. 4,020,325 and 4,024,379 and their structure and operation are described in detail and are not repated herein. Directing attention to FIG. 1, casing 11, suitable for installation in an area where a plurality of washing and drying machines are installed, is shown. It will be understood that the invention hereinafter described is useful in other environments, but the presently preferred use is as has been heretofore stated. Features of the structure shown in FIG. 1 are the use of plural card insertion slots 13a, 13b, for the card 14. The plural slots are useful so that if the mechanism or electronics associated with one of the slots is malfunctioning, the user may insert the card in the other slot, thereby preventing all of the laundry machines from being inoperative. In a preferred use, there are a number of laundry machines serviced by a single casing 11. The patron turns the knob 16 to select a particular machine which he wishes to use. Thus, dial cover 17 is formed with a window 18 through which a number corresponding to the selected machine is observed.

Immediately within the front 12 and in alignment with the top and bottom of slot 13a are two horizontal, vertically spaced plates 22 and 26. Details of construction of said plates and their mounting are shown in FIG. 6. Thus, upper plate 22 has relieved bottom longitudinal edges 23 and plate 26 has relieved top longitudinal edges 27. On either side, a T-shaped member 28 is provided and the leg 29 thereof fits into the relief portions 23 and 27. The thickness of leg 29 and the depth of reliefs 23, 27 is such that the passageway 31 between the opposed plates 22, 26 is slightly greater than the thickness of the card 14. Also, the distance between the inner edges 32 or bottoms of the legs 29 is slightly greater than the width of the card 14. Accordingly, the passageway 31 is accurately defined by the plates 22, 26 and the inner edges 32. The possibility of worn or damaged cards 14 lodging in the walls of the passageway 31 is eliminated.

Directing attention to FIG. 7, a modified structure is shown. A T-shaped member 96 is provided. The leg 97 thereof is formed with a first relief 98 spaced from the outer edge of the member 96, and then near its outer extremity with a second relief 99. A second T-shaped member 96a having leg 97a and first and second reliefs 98a, and 99a overlaps the first-mentioned T-shaped member 96. The shoulders 101 of the first relief 98, 98a are spaced the width of card 14 and the distance between the legs 97, 97a allows for the thickness of the card. The advantage of FIG. 7 over FIG. 6 is that the members 96 of FIG. 7 may be made as an extrusion, reducing the fabrication costs. The two members 96 are identical in cross-section, thus reducing die costs.

The patron positions the card as shown in FIG. 1 and inserts the card partially within one of the slots 13a, 13b. The passageway 31 in registry with the slot accurately guides passage of the card 14 into and out of the machine.

Mounted on bottom plate 26 or leg 97a is a microswitch 36 having a switch arm which extends into the passageway 31. The inner edge of the card moves the switch arm and energizes motor 37 which is mounted in motor clamp 37a. On the shaft of motor 37 is a gear 38 which meshes with gear 39 on the end of drive shaft 41. A knurled roller 42 is fixed for rotation with shaft 41 and engages the card 14 and drives it inward of the apparatus. Mounted on lower plate 26 or leg 97a is a back-up roller 43 in registry with roller 42. Roller 43 is mounted on shaft 44 carrying a gear 46 which meshes with gear 39. Springs 47 which are imbedded in the members 28 or 96, 96a bear upon shaft 44 and bias the back-up roller 43 toward the roller 42 so that pressure is applied on the card 14. As the rollers 42, 43 turn, the card is frictionally engaged and driven. The positions of the rollers 42, 43 are such that when the patron has fully inserted the card 14, the motor 47 pulls the card into the machine and it does not remain outside the slot 13, thereby eliminating mischievous interference with operation.

As the card is driven into the machine, it passes a dual reading and recording head 51, 51a positioned above a window in plate 22. Head assembly 51, 51a is mounted in a holder 52 secured to plate 22 and biased into the passageway 31 so that the head assembly 51, 51a is in contact with the card 14. A back-up roller 53 having a shaft 54 is mounted on the plate 27 immediately below head 51, 51a and also fits into an aperture in plate 27. This insures that the card travels in contact with the heads. Of course, other means of mounting the head may be employed.

At the inner end of plate 22 is another window in which is installed optical sensor 56. When the inner edge of card 14 encounters sensor 56, by electrical means hereinafter explained, motor 37 reverses and rollers 42, 43 drive the card 14 toward the slot 13, and the punch hereinafter described impacts card 14.

The punch mechanism 60, in a preferred embodiment of this mechanism, is illustrated in FIG. 4. Supports 61 is "L" shaped in cross-section. The top flange 62 of support 61 is secured to bottom plate 26. Bell crank 63 is secured by pivot 64 to support 61. Solenoid 66 is mounted on bracket 67 which is a right angle extension of support 61. The armature 68 of solenoid 66 at its distal end is formed in a clevis 69 pinned by pin 71 to link 72 which is pivotally attached to the lower end of bell crank 63 by means of spacer 73.

Needle holder 74 is pivotally attached to the upper arm of bell crank 63 by pivot 76. Needle 77 received in holder 74 has a point 78 at its distal end and its proximal end 79 is threaded into the upper end of needle holder 74. Set screw 80 holds the needle 77 in adjusted position. Projecting outwardly (to the left in FIG. 7) from needle holder 74 is pin 81 which projects through an elongated slot 82 in ear 83 which extends at right angles to the plane of bell crank 63. Spring 84 surrounds pin 81 and is interposed between ear 83 and needle holder 74, biasing needle holder 74 in a clockwise direction as viewed in FIG. 4 against stop 65. Spring 70 is attached at one end to ear 83 and at its other end to bracket 67 of support 61. Spring 70 biases bell crank 63 in a counterclockwise direction about pivot 64.

Back-up roller 86 has a rubber or rubber-like face 87 secured by screw 88 to right angle support 89 mounted on upper plate 22.

As card 14 is driven to the left, as viewed in FIG. 1, at an appropriate time as hereinafter explained, the solenoid 66 is energized, causing the bell crank 63 to pivot counter-clockwise to the dot-and-dash position shown in FIG. 4. The point 78 of needle 77 forces a hole 91 at an appropriate location in card 14. Card 14 moves continuously to the right, as viewed in FIG. 4, thus causing the needle 77 to pivot clockwise, as viewed in FIG. 4, relative to bell crank 63 against the force of spring 84. De-energization of solenoid 66 and the force of spring 70 cause armature 68 to extend outwardly relative to solenoid 66, thereby pivoting bell crank 63 counterclockwise to initial position. The point 78 of needle 77 is thereby retracted below the level of passageway 31 and out of contact with card 14. Spring 84 returns the needle holder 74 to initial position.

The card 14 is impacted with small holes 91 as shown in FIG. 5 by reason of the point 78 forcing the card against the rubber face 87 of the roller 86. The holes 91 are formed without any cutting out of material of the card 14. Hence, chaff is avoided. Chaff might interfere with functioning of the electronic apparatus or block the passageway 31. By reason of the resilience of the face 87, the material around the hole 91 is stretched and deformed. Hence, even if ironed with a hot iron, the card is permanently deformed, and any dispute as to how many times a given card 14 has been punched is eliminated.

Card 14 has a magnetic strip 92 extending longitudinally thereof located in such a position that it will not be damaged by the drive wheels 42 and 43 and the tape strip 92 will pass directly under the dual heads 51, 51a. Accordingly, strip 92 is encoded with two separate tracks 93a, 93b adjacent opposite edges of the strip 92. (each occupying approximately half the tape width).

Attention is now directed to FIG. 8, a block diagram of the electric circuitry. When the leading edge of card 14 closes switch 36, a signal is directed to the forward control circuitry which starts motor 37 and also the timer. The timer disables the control circuitry, which, in turn, turns off the motor 37 after ten seconds so as to prevent the motor from burning out should a jam occur. Strip 92 passes under magnetic head 51 which reads the material which has previously been encoded thereon (as per prior U.S. Pat. No. 4,020,325). First, the security code which has previously been encoded on track 93a is compared with the security code for the particular machine. It will be understood that it is desirable that a given card 14 be used only with one establishment where washers-dryers are installed; or, at most, a restricted number of such establishments. If the security code on the card compares with that for a particular installation as determined by the comparator, the shift register also stores the number of uses still remaining recorded on the track 93a. In the event the number encoded on the track 93a is 0, the card is moved out of the machine without further action occurring. While the head 51 is reading track 93a, head 51a is reading track 93b, which consists of a series of accurately encoded timing pulses. These pulses replace the clock extraction circuitry and other mechanical or electronic means which time the electronic functions of the circuit of FIG. 8. It will be understood that the speed of movement of card 14 through passageway 31 may vary depending on various conditions, including the condition of the card. It is important that punching, reading, re-recording, etc., all occur at accurately spaced intervals relative to the length of card 14. The track 93b moving in direct proportion to the speed of the card insures that these events occur in proper time sequence.

When the card 14 is fully within the machine, its leading edge interrupts optical sensor 56 which reverses motor 37 through the reverse control circuitry and also sends a signal to the position counter. The track 93b feeds signals to the position counter. As the motor 37 turns to drive the card 14, these signals are fed at a rate proportional to card speed to the position counter. After a proper number of pulses have been received, based on the number of uses remaining on the card, the "one shot" is energized and this activates solenoid 66 to impact the card 14 as has previously been explained in connection with the punch. Meanwhile, the programmer energizes the timer which turns on the washer-dryer relay, the particular machine being selected by means of the knob 16 shown in FIG. 1 but not shown in FIG. 8. PROM (Programmable Read Only Memory) is addressed by the contents of the shift register, the output of the PROM then being one less than the contents of the shift register unless the contents of the shift register is already zero, at which point the output of the PROM remains zero. The output of the PROM determines the number of uses remaining on the card, and which number is to be encoded onto the track 93a. The magnetic head 51 is energized to encode the track 93a with the security code and the PROM output. Simultaneously, magnetic head 51a reads the pulses from track 93b. The electronier uses these timing signals to control the timing of the encoded data thus eliminating the need for an oscillator and insuring uniform data density from card to card.

Track 93a contains data and track 93b is a reference or clock track. These tracks are recorded simultaneously by a master encoding such as that disclosed in U.S. Pat. No. 4,020,325. The clock track 93b is a square wave of uniform mark-space ratio. Its rate is four times the data rate. The phasing between clock and data is such that the assertive edge of the clock coincides with the bit cell boundary of the data.

When the tracks 93a and 93b are read by the heads 51 and 51a, the clock track 93b is read simultaneously with the data track 93a. The second clock transition after the bit cell boundary is used to strobe the data to make the determination whether the bit is a "1" or a "0". The technique therefore makes the reading of the data totally speed independent, within the limitations imposed by the response of the electronics.

When new data is over-written on the data track 93a, the clock track 93b is read and the data is written in synchronism with the clock track. Thus, the phasing of the new data and the bit packing density are identical to that which was originally written by the master writer. This feature eliminates the need of an oscillator and/or a phase lock loop associated with the write electronics. The integrity of the data spacing and bit packing density is maintained regardless of the speed of movement of the card 14.

Metering of the card 14 is accomplished by counting clock pulses from the time when the card leaves the card edge sensor 56. Counting pulses assures uniform metering of the card and is a function of the bit packing density of the clock track 93b.

Use of two tracks, particularly when side-by-side on a single tape offers a number of advantages. The recording of timing pulses on the second track affords unusual speed variation tolerance.

The pulses on the second track control the rate at which data is written on the first track as the direction of the tape is reversed. Uniformity and integrity of data recorded on the first track is attained independent of the reader of the first track.

Additionally, the use of timing pulses on the second track eliminates the use of oscillators, clocks, phase locked loops and other timing devices. The system is independent of the speed of movement of the tape or the card, yet uniformity of data is obtained.

What is claimed is:

1. A system for actuating apparatus external to said system comprising a card having a longitudinal strip of magnetic material thereon encoded with two separate longitudinal tracks, a first said track being magnetically encoded with first signals indicating a number of potential uses of said card to actuate said apparatus, said second track being magnetically encoded with second signals comprising timing pulses spaced longitudinally along said second track at equidistant intervals, a card reader comprising guide means shaped to receive said card, reversible drive means for driving said card in both directions longitudinally of said guide means, a read-write first head positioned to read said first track as it moves inward of said guide means and write on said first track as it moves outward of said guide means and a second read head positioned to read said second track as said card is driven in either direction by said drive means, a counter receiving said second signals from said second head at a rate proportional to the speed of movement of said card, a shift register storing said first signals on a time sequence as determined by said second signals, first means receiving signal from said shift register and emitting a third signal which is numerically one less than said first signal, second means for energizing said apparatus if said third signal is numerically at least one, said first head writing said third signal on said first track in timed relation as read on said second track by said second head, a punch positioned to punch said card as said card travels outward of said guide means, electrical means for actuating said punch and a control for said electrical means energized dependent upon said counter so that, for each use of said card, said card is punched at a separate location.

2. A system according to claim 1 in which said second signals are a square wave having a rate which is greater than the data rate of said first signals, said first signals having pulses which are defined as either a "1" or a "0", the assertive edge of said second signals coinciding with the start of said pulses of said first signals, said second signals strobing said first signals in said shift register to determine whether each said pulse of said first signal is a "1" or a "0".

3. A system according to claim 2 in which said first means is a PROM.

4. A system according to claim 3 which further comprises reversing means to reverse said drive means to drive said card out of said guide means, said PROM emitting a signal to encode on said first track a signal for one less use than had been encoded thereon before insertion of said card in said system.

5. A system according to claim 4 which further comprises a security code encoded on said first track and a security code comparator testing whether said security code encoded on said first track compares validly with a secure code setting.

6. A system according to claim 5 which further comprises means to encode said valid security code on said first track.

7. A system according to claim 6 in which said pulses on said second track control the rate of re-encoding said valid security code on said first track.

8. A system according to claim 6 which further comprises a pulse generator interposed between said counter and said electrical means to insure only one actuation of said punch per insertion of said card into said system.

* * * * *